US010902030B2

(12) United States Patent
Liu et al.

(10) Patent No.: US 10,902,030 B2
(45) Date of Patent: Jan. 26, 2021

(54) USER REQUEST PROCESSING METHOD AND DEVICE

(71) Applicant: ALIBABA GROUP HOLDING LIMITED, George Town (KY)

(72) Inventors: Zhongwei Liu, Hangzhou (CN); Changhai Yan, Hangzhou (CN); Li Yi, Hangzhou (CN); Shuwei Yin, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 196 days.

(21) Appl. No.: 16/130,983

(22) Filed: Sep. 13, 2018

(65) Prior Publication Data

US 2019/0012365 A1 Jan. 10, 2019

Related U.S. Application Data

(63) Continuation of application No. PCT/CN2017/074872, filed on Feb. 25, 2017.

(51) Int. Cl.
*G06F 15/173* (2006.01)
*G06F 16/28* (2019.01)
(Continued)

(52) U.S. Cl.
CPC ........ *G06F 16/285* (2019.01); *G06F 9/45558* (2013.01); *G06F 9/5061* (2013.01);
(Continued)

(58) Field of Classification Search
CPC .. G06F 16/285; G06F 9/45558; G06F 9/5061; G06F 2009/45587; G06F 9/5083;
(Continued)

(56) References Cited

U.S. PATENT DOCUMENTS 7,751,409 B1 7/2010 Carolan
8,489,811 B1 7/2013 Corbett et al.
(Continued)

FOREIGN PATENT DOCUMENTS

CN 101800762 A 8/2010
CN 102439564 A 5/2012
(Continued)

OTHER PUBLICATIONS

First Chinese Office Action issued in Chinese Application No. CN201610144243.1 dated Sep. 30, 2019, 14 pages.
(Continued)

*Primary Examiner* — John B Walsh
(74) *Attorney, Agent, or Firm* — Finnegan, Henderson, Farabow, Garrett & Dunner, LLP

(57) ABSTRACT

The present disclosure provides user request processing methods and devices. One exemplary method includes: determining a first container corresponding to a user request after the user request is received; determining a logical container corresponding to the first container by using a preset relationship between the first container and the logical container; acquiring a container cluster corresponding to the logical container by using a logical address corresponding to the logical container, wherein the container cluster includes at least two second containers; and processing the user request by using the second containers. The user request can be simultaneously processed by the first container and the at least two second containers. The first container can call the second containers, so that different containers can share data and handle the same application together. Further, scale-out of second containers in the container cluster can be implemented, thus improving user request processing capability.

17 Claims, 5 Drawing Sheets

(51) Int. Cl.
 *H04L 29/08* (2006.01)
 *G06F 9/455* (2018.01)
 *G06F 9/50* (2006.01)
 *H04L 29/12* (2006.01)

(52) U.S. Cl.
 CPC .......... *H04L 29/08* (2013.01); *H04L 61/1511* (2013.01); *H04L 61/2503* (2013.01); *H04L 67/10* (2013.01); *H04L 67/1014* (2013.01); *G06F 2009/45587* (2013.01)

(58) Field of Classification Search
 CPC ... G06F 9/5077; G06F 9/45533; H04L 29/08; H04L 67/10; H04L 61/1511; H04L 61/2503; H04L 67/1014; H04L 67/1097; H04L 67/2833; H04L 67/2842; H04L 67/32
 See application file for complete search history.

(56) References Cited

U.S. PATENT DOCUMENTS

| | | | |
|---|---|---|---|
| 8,775,773 | B2 | 7/2014 | Acharya et al. |
| 10,104,185 | B1 * | 10/2018 | Sharifi Mehr .......... H04L 67/16 |
| 2015/0281111 | A1 * | 10/2015 | Carl ........................ H04L 47/70 709/226 |
| 2017/0063722 | A1 * | 3/2017 | Cropper ................ H04L 47/823 |

FOREIGN PATENT DOCUMENTS

| | | |
|---|---|---|
| CN | 102880475 A | 1/2013 |
| CN | 102882973 A | 1/2013 |
| CN | 103473298 A | 12/2013 |
| CN | 104731595 A | 6/2015 |
| CN | 104991815 A | 10/2015 |
| CN | 105245373 A | 1/2016 |
| CN | 105245617 A | 1/2016 |
| CN | 105357296 A | 2/2016 |
| WO | WO 2017/157156 A1 | 9/2017 |

OTHER PUBLICATIONS

First Chinese Search Report issued in Chinese Application No. CN201610144243.1, dated Sep. 17, 2019, 2 pages.

PCT International Search Report issued in International Application No. PCT/CN2017/074872, dated May 31, 2017 (4 pages).

Extended Search Report pursuant to Rule 62 EPC, the Supplementary European Search Report (Art. 153(7) EPC) and the European Search Opinion, issued by the EPO in corresponding International Application No. 17765698.0-1213 / 3432549, dated Feb. 19, 2019 (7 pgs.).

* cited by examiner

USER REQUEST PROCESSING METHOD AND DEVICE

This application claims priority to International Application No. PCT/CN2017/074872, filed on Feb. 25, 2017, which claims priority to and the benefits of priority to Chinese Application No. 201610144243.1, filed on Mar. 14, 2016, both of which are incorporated herein by reference in their entireties.

TECHNICAL FIELD

The present disclosure generally relates to the field of Internet technologies, and in particular, to user request processing methods and devices.

BACKGROUND

With the development of computer and network technologies and the widespread use of cloud computing and other network computing platforms, more and more service systems run on network computing platforms. For service applications of a network computing platform, there may be a large number of users who maintain and share the same server. The core of all service applications is user data. Therefore, security issues regarding isolation and sharing of user private data are of great importance.

A Platform as a Service (PaaS) cloud platform is an operation support platform based on cloud computing technologies. A third-party software developer can deploy application products on the PaaS cloud platform and provide application services to users. A conventional PaaS cloud platform generally can achieve isolation of applications of different software developers through the use of virtual machines, where a virtual machine is the smallest unit for scheduling. However, when the virtual machine is used as the smallest unit, there are many associated problems, such as long start times, occupation of a large amount of system resources, large image storage files, and time-consuming migration and adjustment of running instances. In view of this, some PaaS cloud platforms achieve isolation of applications of different software developers by using the container technology, where a container is the smallest unit for scheduling. The container technology is a virtualization technology that manages codes and applications by virtualizing an operating system. That way, more computing workloads can be placed on one server. Each container can include a complete, exclusive user space.

The Docker technology is a main representative of the container technology. A plurality of Docker containers can be created in a server. Each Docker container is equivalent to a virtual machine. User private data can be stored in different Docker containers, so as to achieve isolation of user private data in the Docker containers through isolation of the Docker containers. However, each Docker container works independently. The Docker container is fully isolated, and one Docker container cannot call another Docker container. As a result, different Docker containers cannot share data and therefore cannot work together to complete the same application.

SUMMARY

In view of the above problems, the present disclosure provides user request processing methods and devices.

According to some embodiments of the present disclosure, an exemplary method can comprise the following steps: determining a first container corresponding to a user request after the user request is received; determining a logical container corresponding to the first container by using a preset relationship between the first container and the logical container; acquiring a container cluster corresponding to the logical container by using a logical address corresponding to the logical container, wherein the container cluster includes at least two second containers; and processing the user request by using the second containers.

In some embodiments, the process of determining a first container corresponding to a user request can further comprise: parsing out domain name information or IP address information from the user request, and determining in all the containers a first container matching the domain name information or the IP address information. In some embodiments, after determining the first container corresponding to the user request, the method can further include processing the user request by using the first container.

In some embodiments, the process of determining a logical container corresponding to the first container by using a preset relationship between the first container and the logical container can comprise: configuring in the first container a link relationship between the first container and the logical container; and determining the logical container corresponding to the first container by using the link relationship.

In some embodiments, the process of acquiring a container cluster corresponding to the logical container by using a logical address corresponding to the logical container can comprise: querying, according to a logical address configured in the logical container, a correspondence between logical addresses and container clusters to obtain a container cluster corresponding to the logical address; and determining the container cluster corresponding to the logical address as the container cluster corresponding to the logical container.

In some embodiments, the method can further comprise: configuring a correspondence between the logical address corresponding to the logical container and the container cluster corresponding to the logical container; and recording, in the container cluster, address information of the at least two second containers. The at least two second containers are containers that can be called by the first container corresponding to the logical container. The method can further comprise: creating, when the container cluster needs to be expanded, another second container that can be called by the first container; and recording, in the container cluster, address information of the currently created second container.

In some embodiments, the process of processing the user request by using the second containers can include: allocating processing tasks of the user request to each second container in the container cluster according to a preset policy; and using each second container to process the allocated processing tasks. The preset policy can include a load balancing policy.

In some embodiments, the method can further include: storing a correspondence between the logical address corresponding to the logical container and domain name information corresponding to the logical container into a domain name system (DNS) service. That way, another container can acquire the logical address corresponding to the logical container from the DNS service by using the domain name information corresponding to the logical container, and access the container cluster corresponding to the logical container by using the logical address corresponding to the logical container.

In some embodiments, the first container and the second containers in the container cluster include at least one Docker container.

According to some embodiments of the present disclosure, user request processing devices are provided. One exemplary user request processing device comprises a determining module, an acquiring module, and a processing module. The determining module is configured to determine a first container corresponding to a user request after the user request is received; and determine a logical container corresponding to the first container by using a preset relationship between the first container and the logical container. The acquiring module is configured to acquire a container cluster corresponding to the logical container by using a logical address corresponding to the logical container, wherein the container cluster includes at least two second containers. The processing module is configured to process the user request by using the second containers.

In some embodiments, in the process of determining a first container corresponding to a user request, the determining module can be further configured to: parse out domain name information or IP address information from the user request; and determine, among all the containers, a first container matching the domain name information or the IP address information.

In some embodiments, the processing module can be further configured to process the user request by using the first container after the determining module determines the first container corresponding to the user request.

In some embodiments, in the process of determining a logical container corresponding to the first container by using a preset relationship between the first container and the logical container, the determining module can be further configured to: configure in the first container a link relationship between the first container and the logical container; and determine the logical container corresponding to the first container by using the link relationship.

In some embodiments, in the process of acquiring a container cluster corresponding to the logical container by using a logical address corresponding to the logical container, the acquiring module can be further configured to: configure a logical address in the logical container; query, according to the logical address configured in the logical container, a correspondence between logical addresses and container clusters to obtain a container cluster corresponding to the logical address; and determine the container cluster corresponding to the logical address as the container cluster corresponding to the logical container.

In some embodiments, the user request processing device can further include a maintenance module. Before the acquiring module queries the correspondence between logical addresses and container clusters, the maintenance module can be configured to: configure a correspondence between the logical address corresponding to the logical container and the container cluster corresponding to the logical container; and record, in the container cluster, address information of the at least two second containers, wherein the second containers are containers that can be called by the first container corresponding to the logical container. The maintenance module can be further configured to: create, when the container cluster needs to be expanded, another second container that can be called by the first container; and record, in the container cluster, address information of the currently created second container.

In some embodiments, in the process of processing the user request by using the second containers, the processing module can be further configured to: allocate processing tasks of the user request to each second container in the container cluster according to a preset policy; and use each second container to process the allocated processing tasks. The preset policy can include a load balancing policy.

In some embodiments, the user request processing device can further include a storage module. The storage module can be configured to store a correspondence between the logical address corresponding to the logical container and domain name information corresponding to the logical container into a DNS service. That way, another container can acquire the logical address corresponding to the logical container from the DNS service by using the domain name information corresponding to the logical container, and access the container cluster corresponding to the logical container by using the logical address corresponding to the logical container.

In some embodiments, the first container and each second container in the container cluster can include at least one Docker container.

Based on the above, according to the technical solutions provided by some embodiments of the present disclosure, by configuring a preset relationship between a first container and a logical container, the logical container corresponding to the first container can be determined. A container cluster including at least two second containers that correspond to the logical container can be acquired by using a logical address corresponding to the logical container. A user request can be processed by using the first container and the at least two second containers. As such, one user request may be simultaneously processed by the first container and the at least two second containers. The containers do not work independently and are not fully isolated. One first container can call at least two second containers in the container cluster, so that different containers can share data with each other and can work to complete the same application. In addition, scale-out of second containers in the container cluster can be implemented conveniently by adding new second containers to the container cluster, thus improving user request processing capability.

BRIEF DESCRIPTION OF THE DRAWINGS

To further describe the technical solutions in the embodiments of the present disclosure, the accompanying drawings used in the description are briefly introduced. It is appreciated that the drawings provided herein are merely examples according to some embodiments of the present disclosure. Other drawings can be obtained according to these drawings, consistent with the present disclosure.

DETAILED DESCRIPTION

Terms used in the present disclosure are merely for the purpose of describing some exemplary embodiments and are not intended to limit the present disclosure. Singular forms used with terms such as "a/an," "said" and "the" in the present disclosure and the claims may include plural forms, unless otherwise clearly specified by the context. It should be appreciated that the term "and/or" as used herein may indicate inclusion of any or all possible combinations of one or more associated items listed therein.

It should be appreciated that although terms such as first, second and third may be used in the present disclosure to describe certain items, such terms are merely used for distinguishing items for illustration purposes. In addition, depending on the context, the term "if" as used herein may be construed as "when," "while" or "in response to determining."

In view of the problems in the existing technology, the embodiments of the present disclosure provide user request processing methods. The methods can be applied to devices that use the container technology to process user requests, such as servers. The container technology is a virtualization technology that manages codes and applications by virtualizing an operating system. That way, more computing workloads can be placed on one server and the capacity be expanded for new computing tasks in an instant. Each container can include a complete, exclusive user space. Changes in one container do not affect the runtime environment of other containers.

Figure 1:
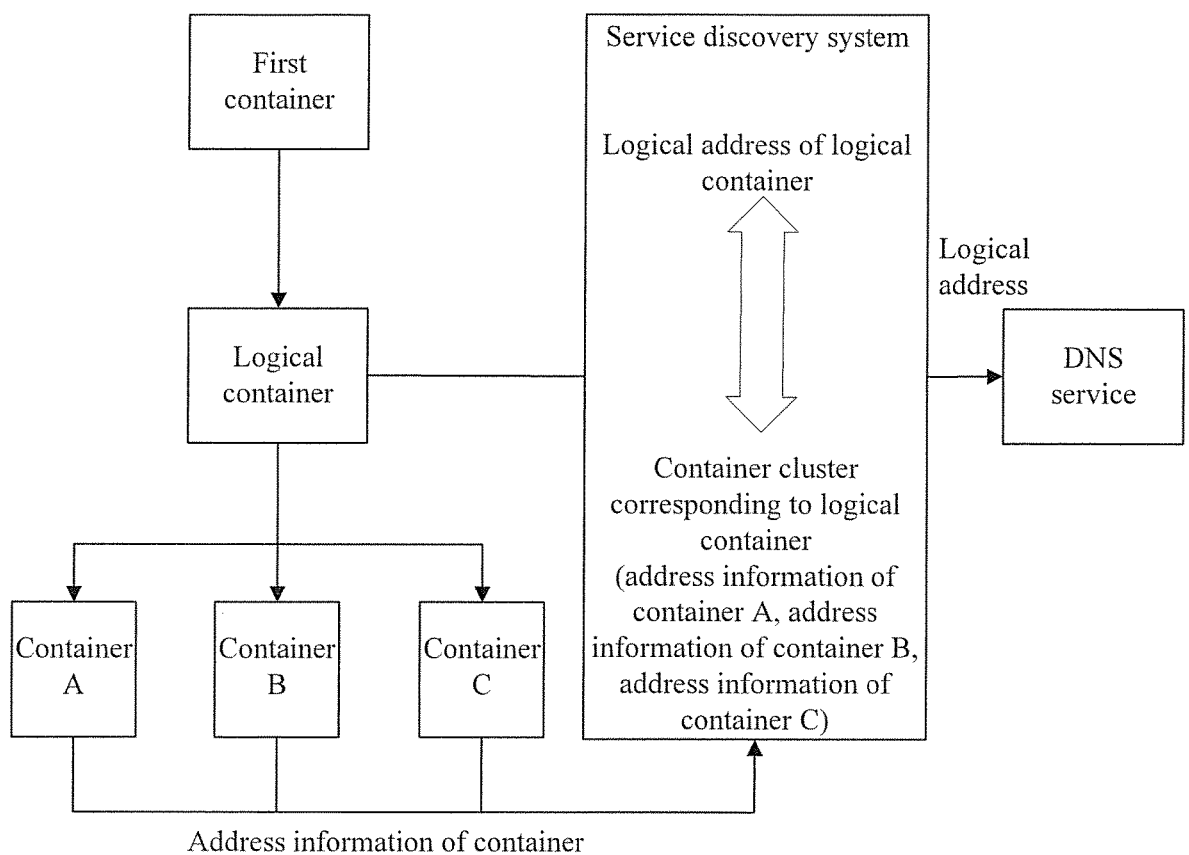
FIG. 1 is a schematic diagram of an exemplary application scenario according to some embodiments of the present disclosure.

FIG. 1 is a schematic diagram of an exemplary application scenario 100 according to some embodiments of the present disclosure. As shown in FIG. 1, a plurality of containers is created in a server. Each container is equivalent to a virtual machine. User private data can be stored in different containers, so as to achieve isolation of user private data in the containers through isolation of the containers. On this basis, according to some embodiments of the present disclosure, one container can call another container so that different containers can share data with each other and handle the same application together. Further, a container cluster including at least two containers that corresponds to a logical container can be acquired based on a preset relationship between containers and logical containers, as well as a logical address corresponding to the logical container. That way, a user request can be processed by using a plurality of containers.

For ease of description, in a process where one container calls another container, the one container may be referred to as a first container, and another container may be referred to as a second container. In addition, in some embodiments of the present disclosure, at least two second containers having the same function may be deployed. The at least two second containers can complete processing of the same application together. For example, in FIG. 1, the second containers can include a container A, a container B, and a container C.

Figure 2:
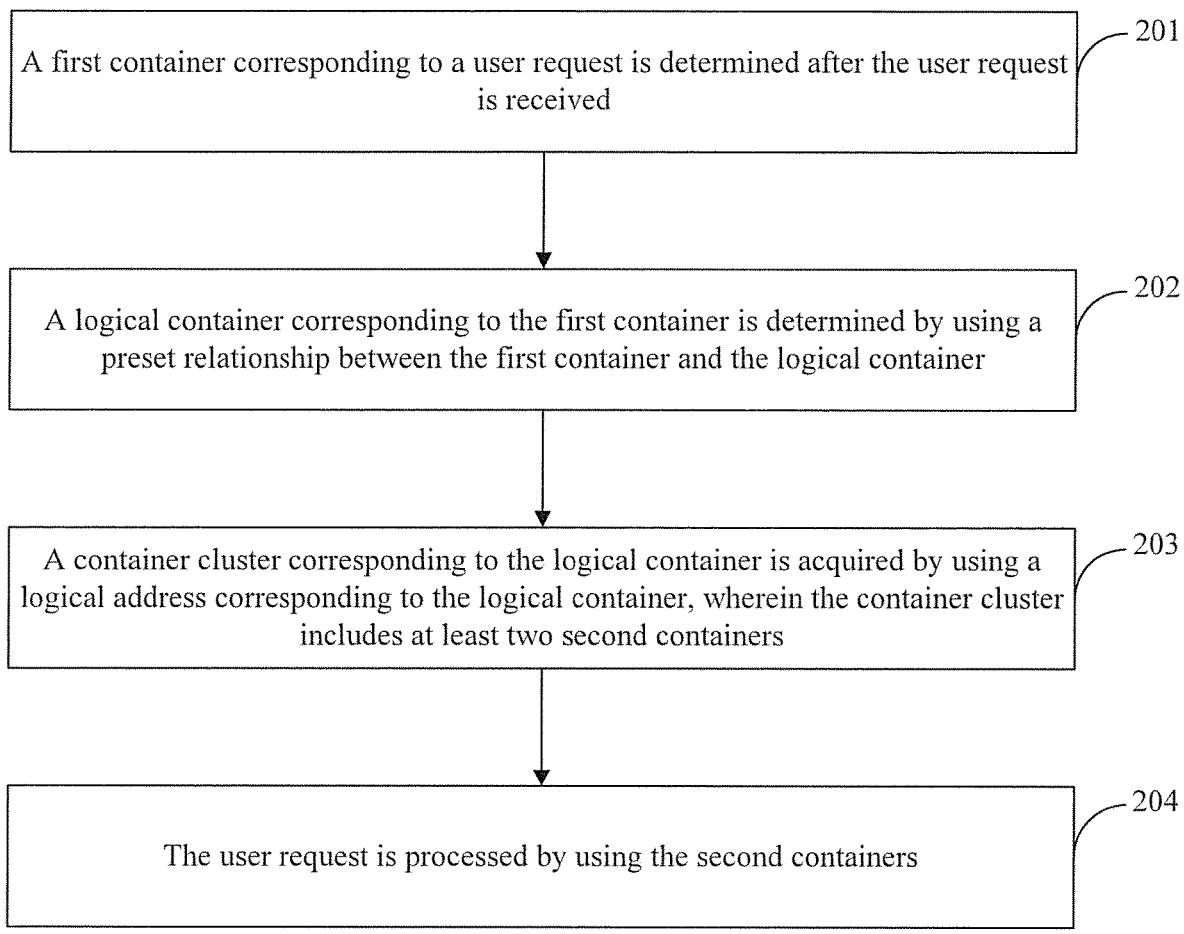
FIG. 2 is a flowchart of an exemplary user request processing method according to some embodiments of the present disclosure.

According to some embodiments of the present disclosure, user request processing methods are further provided. FIG. 2 is a flowchart of an exemplary user request processing method 200 according to some embodiments of the present disclosure. For example, the user request processing method 200 can be applied in the above application scenario described with reference to FIG. 1.

In step 201, a first container corresponding to a user request is determined after the user request is received. In some embodiments, the process of determining a first container corresponding to a user request may be implemented in the following manner: parsing out domain name information or IP address information from the user request; and determining, among all the containers, a first container matching the domain name information or the IP address information.

For example, the first container may be a first container that provides applications including blogs, cloud services, APIs (Application Programming Interface), web, and other applications. The first container can provide its domain name information or IP address information to a client terminal. When accessing blogs, cloud services, APIs, web, and other applications, the client terminal can send a user request carrying the domain name information or the IP address information to a server. After receiving the user request, the server can parse out the domain name information or the IP address information from the user request, and determine among all local containers a first container matching the domain name information or the IP address information, namely, the first container corresponding to the user request.

In some embodiments of the present disclosure, after the first container corresponding to the user request is determined, the user request may further be processed by using the first container. For example, for a user request associated with a blog application, the first container may be used to process the user request. The processing can include analyzing information carried in the user request, such as to-be-written data, user identity information, and a link carried in the user request, and acquiring content corresponding to the link and so on. For user requests associated with other applications, the processing procedures of the user request may include similar processing of the user request associated with the blog application, details of which are not repeated herein. Based on the above, the first container can provide computing resources, memory resources, network resources, storage resources and the like for processing the user request, and the user request can be processed by using the resources provided by the first container.

In step 202, a logical container corresponding to the first container is determined by using a preset relationship between the first container and the logical container. The preset relationship may be set arbitrarily based on the actual application scenario, as long as the preset relationship exists between the first container and the logical container, and the logical container corresponding to the first container can be found based on the preset relationship. The first container may correspond to only one logical container.

In some embodiments, the process of determining a logical container corresponding to the first container by using a preset relationship between the first container and the logical container may be implemented in the following manner: configuring, in the first container, a link relationship between the first container and the logical container; and determining the logical container corresponding to the first container by using the link relationship.

In container technologies, link relationship is a method for connecting two containers. A connection can be established between two containers by using the link relationship. On this basis, in some embodiments, the link relationship in container technologies may be applied. As noted above, a link relationship between the first container and the logical container can be configured in the first container, and the logical container corresponding to the first container can be determined by using the link relationship.

In step 203, a container cluster corresponding to the logical container is acquired by using a logical address corresponding to the logical container. The container cluster can include at least two second containers.

In some embodiments, the process of acquiring a container cluster corresponding to the logical container by using a logical address corresponding to the logical container can comprise: querying, according to a logical address configured in the logical container, a correspondence between logical addresses and container clusters to obtain a container cluster corresponding to the logical address; and determining the container cluster corresponding to the logical address as the container cluster corresponding to the logical container. The correspondence between the logical address corresponding to the logical container and the container cluster corresponding to the logical container can be configured. The address information of the at least two second containers can be recorded in the container cluster, wherein the second container is a container that can be called by the first container corresponding to the logical container.

In some embodiments, to enable the first container to call the at least two second containers, the link relationship between the first container and the logical container can be configured in the first container, instead of a link relationship between the first container and the second container. That way, the logical container corresponding to the first container can be determined based on the link relationship. In addition, the correspondence between the logical address corresponding to the logical container and the container cluster corresponding to the logical container can be configured. The address information of the at least two second containers can be recorded in the container cluster. The container cluster corresponding to the logical address can be obtained by querying, according to the logical address configured in the logical container, the correspondence between logical addresses and container cluster. Then the container cluster can be determined as the container cluster corresponding to the logical container. The at least two second containers in the container cluster can be matched with the first container. The second container is a container that can be called by the first container. As such, the first container can call the at least two second containers for processing.

As shown in FIG. 1, a service discovery system may be set in the server. The service discovery system can be configured to maintain the correspondence between the logical address corresponding to the logical container and the container cluster corresponding to the logical container. The service discovery system can further record in the container cluster the address information of the at least two second containers, for example, IP addresses and ports of the second containers. It is appreciated that, in actual applications, the address information may be other types of address information, as long as it can represent the second container.

For example, the service discovery system can maintain a correspondence between a logical address 1 corresponding to a logical container 1 and a container cluster 1 corresponding to logical container 1. The service discovery system also records, in container cluster 1, address information of container A, address information of container B, and address information of container C, as shown in FIG. 1. In addition, the service discovery system can also maintain a correspondence between a logical address 2 corresponding to a logical container 2 and a container cluster 2 corresponding to logical container 2. The service discovery system also records, in container cluster 2, address information of a container M and address information of a container N.

For ease of description, descriptions are given below using an example where the service discovery system maintains the correspondence between logical address 1 corresponding to logical container 1 and container cluster 1 corresponding to logical container 1. The service discovery system further records, in container cluster 1, the address information of container A, the address information of container B, and the address information of container C.

When logical container 1 is created, logical address 1 corresponding to logical container 1 can be created in logical container 1. Logical address 1 corresponding to logical container 1 can be recorded in the service discovery system.

When container A (second container) is created, the address information of container A can be created in container A, and the address information of container A can be recorded in the service discovery system. In addition, the service discovery system can learn that the first container needs to call container A for processing, and that the first container corresponds to logical container 1. A correspondence between logical address 1 and the address information of container A can be recorded in the service discovery system.

When container B (second container) is created, the address information of the container B can be created in container B. The address information of container B can be recorded in the service discovery system. In addition, the service discovery system can learn that the first container needs to call container B for processing, and that the first container corresponds to logical container 1. A correspondence between logical address 1 and the address information of container B can be recorded in the service discovery system.

When container C (second container) is created, the address information of the container C can be created in the container C. The address information of the container C can be recorded in the service discovery system. In addition, the service discovery system can learn that the first container needs to call container C for processing, and that the first container corresponds to logical container 1. A correspondence between logical address 1 and the address information of container C can be recorded in the service discovery system.

On the basis of the foregoing, the correspondence between logical address 1 corresponding to logical container 1 and container cluster 1 corresponding to logical container 1 can be recorded in the service discovery system. The address information of container A, the address information of container B, and the address information of container C can be recorded in container cluster 1. Based on this, after logical container 1 corresponding to the first container is determined, the corresponding container cluster 1 can be found in the service discovery system through query using logical address 1 corresponding to logical container 1. The address information of container A, of container B, and of container C is recorded in container cluster 1.

Based on the above technical solutions, by means of service discovery, the correspondence between the logical address corresponding to the logical container and the container cluster corresponding to the logical container can be recorded in the service discovery system. The address information of the at least two second containers can be recorded in the container cluster. That way, a container cluster that can maintain the address information of the at least two second containers can be obtained by parsing according to the logical address. As such, the first container can be associated with the at least two second containers (for example, container A, container B, container C, etc.), thereby achieving a one-to-many association of containers. The first container can then call the at least two second containers for processing.

In addition, based on the above technical solutions, scale-out of second containers can further be implemented. For example, when the container cluster needs to be expanded, a second container that can be called by the first container can be created. The address information (for example, IP address and port) of the currently created second container can be recorded in the container cluster.

Figure 3:
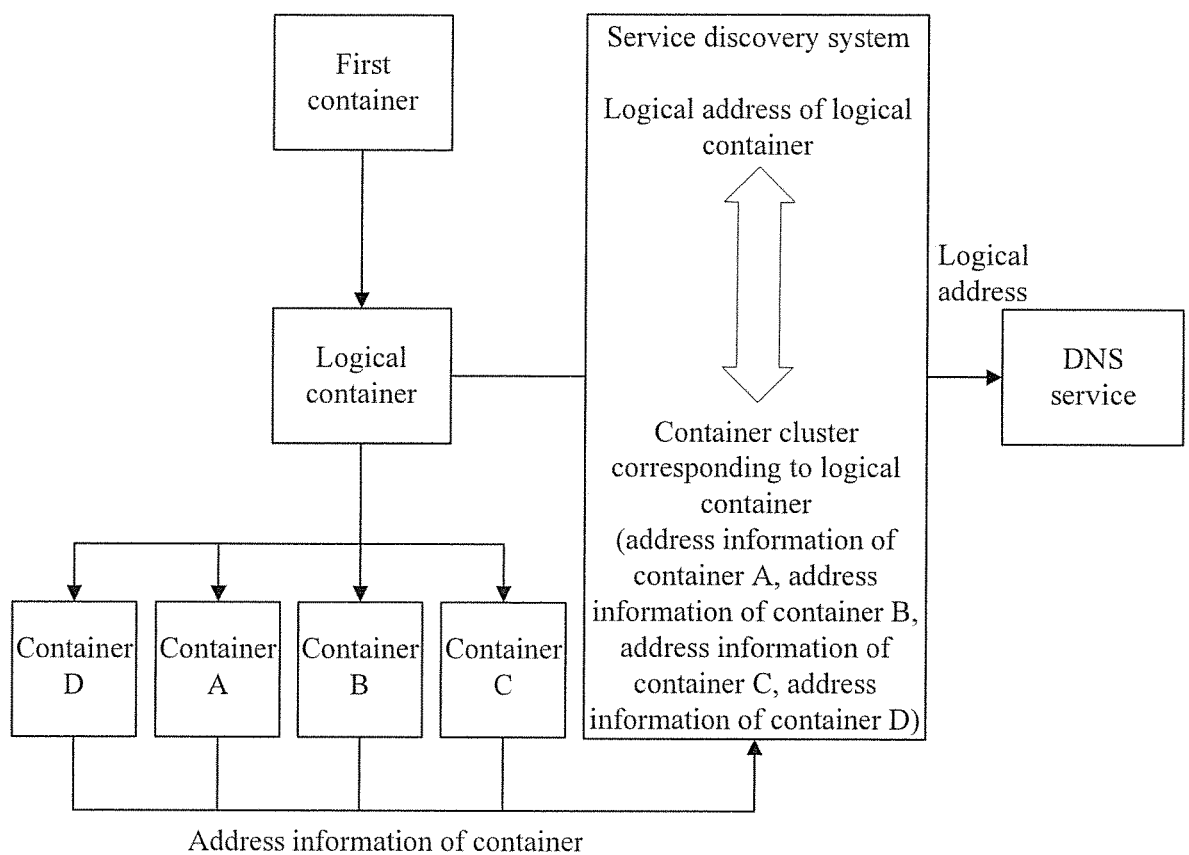
FIG. 3 is a schematic diagram of an exemplary application scenario illustrating scale-out according to some embodiments of the present disclosure.

FIG. 3 is a schematic diagram of an exemplary application scenario 300 illustrating scale-out according to some embodiments of the present disclosure. As shown in FIG. 3, assuming that container cluster 1 needs to be expanded, for example, by adding a container D (second container) to container cluster 1. In that case, a container D that can be called by the first container (the first container corresponding to logical container 1) can be created. The address information of container D can be created in container D, and the address information of container D can be recorded in the service discovery system.

In addition, the service discovery system can learn that the first container needs to call container D for processing, and that the first container corresponds to the logical container 1. Therefore, a correspondence between logical address 1 and the address information of container D can be recorded in the service discovery system. On this basis, for the first container, the logical container corresponding to the first container remains the same, the logical address corresponding to the logical container remains the same. The second containers in container cluster 1 corresponding to the logical address are changed, that is, the address information of container D is added.

Before container D is added to container cluster 1, the first container corresponding to the user request can be determined after the user request is received. Logical container 1 corresponding to the first container can be determined by using a preset relationship between the first container and logical container 1. Container cluster 1 corresponding to logical container 1 can be acquired by using logical address 1 corresponding to the logical container. Container cluster 1 records the address information of container A, container B, and container C. As such, the first container can be associated with container A, container B, and container C.

After container D is added to container cluster 1, the first container corresponding to the user request can be determined after the user request is received. Logical container 1 corresponding to the first container can be determined by using the preset relationship between the first container and logical container 1. Container cluster 1 corresponding to logical container 1 can be acquired by using logical address 1 corresponding to logical container 1. In container cluster 1, the address information of container A, container B, container C, and container D are recorded. As such, the first container can be associated with container A, container B, container C, and container D.

In step 204, the user request is processed by using the second containers. In some embodiments, the process of processing the user request by using the second containers may further include, but is not limited to: allocating processing tasks of the user request to each second container in the container cluster according to a preset policy; and using each second container to process the allocated processing tasks. The preset policy may include, but is not limited to, a load balancing policy.

For example, the address information of container A, of container B, of container C, and of container D are recorded in the container cluster 1. Container A, container B, container C, and container D can all be used to provide processing associated with a data storage application. On the basis of processing the user request by using the first container, a processing task of the user request (for example, storing data 1 to data 40 into a database) can be divided into a plurality of processing tasks. For example, the processing task can be divided into a processing task 1 (for example, for storing data 1 to data 10 into the database), a processing task 2 (for example, for storing data 11 to data 20 into the database), a processing task 3 (for example, for storing data 21 to data 30 into the database), and a processing task 4 (for example, for storing data 31 to data 40 into the database).

According to a load balancing policy, processing task 1 can be allocated to container A in the container cluster 1, processing task 2 can be allocated to container B in container cluster 1, processing task 3 can be allocated to container C in container cluster 1, and processing task 4 can be allocated to container D in the container cluster 1. Container A can be used to handle processing task 1 allocated to container A, for example, storing data 1 to data 10 into the database. Container B can be used to handle processing task 2 allocated to container B, for example, storing data 11 to data 20 into the database. Container C can be used to handle processing task 3 allocated to container C, for example, storing data 21 to data 30 into the database. Container D can be used to handle processing task 4 allocated to container D, for example, storing data 31 to data 40 into the database.

It is appreciated that the above process is merely an example of processing a user request by using second containers. Other processes of processing the user request by second containers that can be called by the first container can be obtained consistent with the present disclosure. Such processes shall all fall within the protection scope of the present disclosure.

In some embodiments, as shown in FIG. 1 or FIG. 3, a correspondence between the logical address corresponding to the logical container and domain name information corresponding to the logical container may further be stored into a DNS service. For example, the correspondence between the logical address and the domain name information can be stored into the DNS service by using the service discovery system. Based on this, other containers can acquire the logical address corresponding to the logical container from the DNS service, by using the domain name information corresponding to the logical container. The containers can then access the container cluster corresponding to the logical container by using the logical address corresponding to the logical container. That is, other containers can call the at least two second containers in the container cluster by using the domain name information corresponding to the logical container.

For example, the at least two second containers in the container cluster can be used to provide processing associated with a web application. The correspondence between the logical address corresponding to the logical container and the domain name information corresponding to the logical container can be stored into the DNS service. That way, the first container can acquire the logical address corresponding to the logical container from the DNS service by using domain name information corresponding to the web application (the domain name information can be provided to the first container). The first container can then call the at least two second containers in the container cluster by using the logical address corresponding to the logical container.

In addition, other applications such as the above data storage application can be provided by the at least two second containers in the container cluster. If the correspondence between the logical address corresponding to the logical container and the domain name information corresponding to the logical container is not stored in the DNS service, the logical address corresponding to the logical container can be provided to the first container. That way, the first container can call the at least two second containers in the container cluster by using the logical address corresponding to the logical container, instead of using the domain name information corresponding to the logical container.

In some embodiments, the first container and each second container in the container cluster can include a Docker container. For example, as shown in FIG. 1 or FIG. 3, each of the first container, container A, container B, container C, and container D can be a Docker container.

Based on the above technical solutions, according to some embodiments of the present disclosure, by configuring a preset relationship between a first container and a logical container, the logical container corresponding to the first container can be determined. A container cluster including at least two second containers that correspond to the logical container can be acquired by using a logical address corresponding to the logical container. A user request can be processed by using the first container and the at least two second containers. As such, one user request may be simultaneously processed by the first container and the at least two second containers. The containers do not work independently, and they are not fully isolated. One first container can access at least two second containers in the container cluster so that different containers can share data with each other and can work together to handle the same application. In addition, scale-out of second containers in the container cluster can be implemented conveniently by adding new second containers to the container cluster, thereby improving capability for processing user requests.

Figure 4:
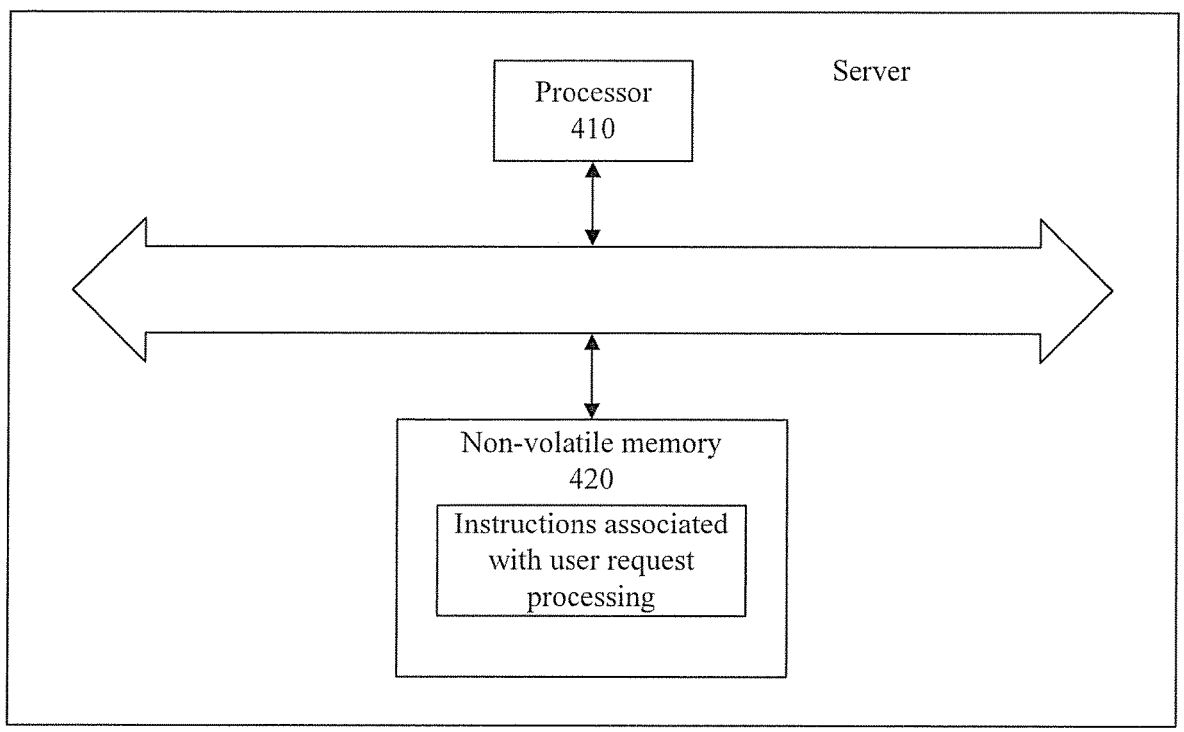
FIG. 4 is a structural diagram of hardware of an exemplary server according to some embodiments of the present disclosure.

According to some embodiments of the present disclosure, user request processing devices are provided. For example, the user request processing devices can be applied to a server. Further, the user request processing devices can be implemented by software, hardware, or a combination of software and hardware. Taking the software implementation as an example, the user request processing device can be implemented a processor of the server reading and executing corresponding computer program instructions stored in a non-volatile memory. With respect to the hardware level, FIG. 4 is a structural diagram of hardware of an exemplary server 400 according to some embodiments of the present disclosure. In some embodiments, the server may further include other hardware components such as a forwarding chip for packet processing, a network interface, and a memory, in addition to processor 410 and non-volatile memory 420 as shown in FIG. 4. In terms of the hardware structure, the server may also be a distributed device, and may include a plurality of interface cards for extension of packet processing at the hardware level.

Figure 5:
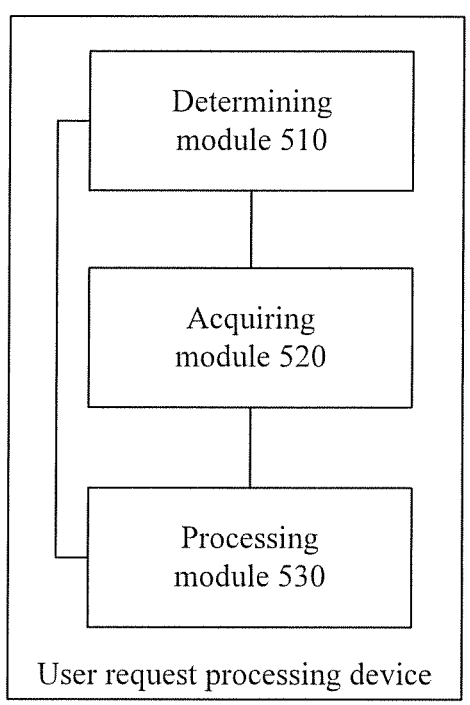
FIG. 5 is a structural diagram of an exemplary user request processing device according to some embodiments of the present disclosure.

FIG. 5 is a structural diagram of an exemplary user request processing device 500 according to some embodiments of the present disclosure. As shown in FIG. 5, the exemplary user request processing device 500 can include a determining module 510, an acquiring module 520, and a processing module 530.

Determining module 510 can be configured to determine a first container corresponding to a user request after the user request is received; and determine a logical container corresponding to the first container by using a preset relationship between the first container and the logical container.

Acquiring module 520 can be configured to acquire a container cluster corresponding to the logical container by using a logical address corresponding to the logical container, wherein the container cluster includes at least two second containers.

Processing module 530 can be configured to process the user request by using the second containers.

In some embodiments, in the process of determining a first container corresponding to a user request, determining module 510 can be configured to: parse out domain name information or IP address information from the user request; and determine, among all the containers, a first container matching the domain name information or the IP address information.

In some embodiments, processing module 530 can be further configured to process the user request by using the first container after determining module 510 determines the first container corresponding to the user request.

In some embodiments, in the process of determining a logical container corresponding to the first container by using a preset relationship between the first container and the logical container, determining module 510 can be configured to configure in the first container a link relationship between the first container and the logical container; and determine the logical container corresponding to the first container by using the link relationship.

In some embodiments, in the process of acquiring a container cluster corresponding to the logical container by using a logical address corresponding to the logical container, acquiring module 520 can be configured to: configure a logical address in the logical container; query, according to the logical address configured in the logical container, a correspondence between logical addresses and container clusters to obtain a container cluster corresponding to the logical address; and determine the container cluster corresponding to the logical address as the container cluster corresponding to the logical container.

In some embodiments, user request processing device 500 can further include a maintenance module configured to: before acquiring module 520 queries the correspondence between logical addresses and container clusters, configure a correspondence between the logical address corresponding to the logical container and the container cluster corresponding to the logical container; and record, in the container cluster, address information of the at least two second containers. The second container is a container that can be called by the first container corresponding to the logical container.

In some embodiments, the maintenance module can be further configured to create, when the container cluster needs to be expanded, a second container that can be called by the first container; and record, in the container cluster, address information of the currently created second container.

In some embodiments, in the process of processing the user request by using the second containers, processing module 530 can be further configured to: allocate processing tasks of the user request to each second container in the container cluster according to a preset policy; and use each second container to process the allocated processing tasks. The preset policy can include a load balancing policy.

In some embodiments, user request processing device 500 can further include (not shown in the figure) a storage module. The storage module can be configured to store a correspondence between the logical address corresponding to the logical container and domain name information corresponding to the logical container into a domain name system DNS service. That way, another container can acquire the logical address corresponding to the logical container from the DNS service by using the domain name information corresponding to the logical container, and can access the container cluster corresponding to the logical container by using the logical address corresponding to the logical container.

In some embodiments, the first container and the second container in the container cluster can include a Docker container.

Based on the above technical solutions, according to some embodiments of the present disclosure, by configuring a preset relationship between a first container and a logical container, the logical container corresponding to the first container can be determined. A container cluster including at least two second containers that correspond to the logical container can be acquired by using a logical address corresponding to the logical container. A user request can be processed by using the first container and the at least two second containers. As such, one user request can be simultaneously processed by the first container and the at least two second containers. That way, the containers do not work independently and are not fully isolated. One first container can access at least two second containers in the container cluster so that different containers can share data with each other and can handle the same application together. In addition, scale-out of second containers in the container cluster can be implemented by adding new second containers to the container cluster, thereby improving user request processing capability.

It is appreciated that the modules described herein may be integrated or separately deployed. The modules may further be combined into one module or may be further divided into a plurality of submodules.

According to the descriptions of the foregoing exemplary embodiments, it is appreciated that some embodiments of the present disclosure can be implemented by means of software and a general hardware platform, or by hardware. Based on such an understanding, the technical solutions in the present disclosure may also be implemented in the form of a software product. The computer software product may be stored in a storage medium and may include a set of instructions for instructing a process or a computer device (which may be a personal computer, a server, a network device, or the like) to perform the methods in the embodiments of the present disclosure. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, cloud storage, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It should be appreciated that the accompanying drawings are merely schematic diagrams of some exemplary embodiments. One or more modules or procedures illustrated in the accompanying drawings may be omitted or modified in some actual implementations. Further, in some embodiments, the above described modules may be distributed in the same device or may be modified or located in two or more devices. The modules may be combined into one module or may be further divided into a plurality of sub-modules. The reference numbers used in the description of the present disclosure are merely for purposes of description, and do not imply any mandatory order or quantity of the described components or elements.

Although several exemplary embodiments of the present disclosure are described above, the present disclosure is not limited thereto and other embodiments may be obtained consistent with the present disclosure. Any variations that can be conceived of by those skilled in the art based on the present disclosure shall fall within the protection scope of the present disclosure.

The invention claimed is:

1. A user request processing method, comprising:
   determining a first container corresponding to a user request;
   determining a logical container corresponding to the first container based on a preset relationship between the first container and the logical container;
   acquiring a container cluster corresponding to the logical container based on a logical address corresponding to the logical container, wherein the container cluster includes at least two second containers, wherein acquiring the container cluster corresponding to the logical container comprises:
     querying, according to the logical address corresponding to the logical container, a correspondence between logical addresses and container clusters to obtain the container cluster corresponding to the logical address; and
     determining the container cluster corresponding to the logical address as the container cluster corresponding to the logical container; and
   processing the user request by using at least one of the second containers.

2. The method according to claim 1, wherein determining the first container corresponding to the user request comprises:
   parsing out at least one of domain name information and IP address information from the user request, and
   determining a first container matching the domain name information or the IP address information.

3. The method according to claim 1, wherein determining the logical container corresponding to the first container comprises:
   configuring a link relationship between the first container and the logical container; and
   determining the logical container corresponding to the first container based on the link relationship.

4. The method according to claim 1, further comprising:
   configuring a correspondence between the logical address corresponding to the logical container and the container cluster corresponding to the logical container;
   recording, in the container cluster, address information of the at least two second containers, wherein the at least two second containers are containers that can be called by the first container;
   creating, another second container that can be called by the first container; and
   recording, in the container cluster, address information of the created another second container.

5. A user request processing method, comprising:
   determining a first container corresponding to a user request;
   determining a logical container corresponding to the first container based on a preset relationship between the first container and the logical container;

acquiring a container cluster corresponding to the logical container based on a logical address corresponding to the logical container, wherein the container cluster includes at least two second containers; and processing the user request by using at least one of the second containers, wherein processing the user request by using at least one of the second containers comprises:

allocating, according to a preset policy, processing tasks associated with the user request to each of the at least two second containers; and using each second container to process the allocated processing tasks, wherein the preset policy comprises a load balancing policy.

6. A user request processing method, comprising:

determining a first container corresponding to a user request;

determining a logical container corresponding to the first container based on a preset relationship between the first container and the logical container;

acquiring a container cluster corresponding to the logical container based on a logical address corresponding to the logical container, wherein the container cluster includes at least two second containers;

processing the user request by using at least one of the second containers;

storing a correspondence between the logical address corresponding to the logical container and domain name information corresponding to the logical container into a domain name system (DNS) service;

acquiring, by a third container, the logical address corresponding to the logical container from the DNS service based on the domain name information corresponding to the logical container; and accessing, by the third container, the container cluster corresponding to the logical container based on the logical address corresponding to the logical container.

7. A user request processing apparatus, comprising:

a memory storing a set of instructions; and at least one processor configured to execute the set of instructions to cause the user request processing apparatus to perform:

determining a first container corresponding to a user request;

determining a logical container corresponding to the first container based on a preset relationship between the first container and the logical container;

acquiring a container cluster corresponding to the logical container based on a logical address corresponding to the logical container, wherein the container cluster includes at least two second containers, wherein acquiring the container cluster corresponding to the logical container comprises:

querying, according to the logical address corresponding to the logical container, a correspondence between logical addresses and container clusters to obtain the container cluster corresponding to the logical address; and determining the container cluster corresponding to the logical address as the container cluster corresponding to the logical container; and processing the user request by using at least one of the second containers.

8. The user quest processing apparatus according to claim 7, wherein determining the first container corresponding to the user request comprises:

parsing out at least one of domain name information and IP address information from the user request, and determining a first container matching the domain name information or the IP address information.

9. The user quest processing apparatus according to claim 7, wherein determining the logical container corresponding to the first container comprises:

configuring a link relationship between the first container and the logical container; and determining the logical container corresponding to the first container based on the link relationship.

10. The user quest processing apparatus according to claim 7, wherein the at least one processor is further configured to execute the set of instructions to cause the apparatus to perform:

configuring a correspondence between the logical address corresponding to the logical container and the container cluster corresponding to the logical container;

recording, in the container cluster, address information of the at least two second containers, wherein the at least two second containers are containers that can be called by the first container;

creating, another second container that can be called by the first container; and recording, in the container cluster, address information of the created another second container.

11. The user quest processing apparatus according to claim 7, wherein processing the user request by using at least one of the second containers comprises:

allocating, according to a preset policy, processing tasks associated with the user request to each of the at least two second containers; and using each second container to process the allocated processing tasks, wherein the preset policy comprises a load balancing policy.

12. The user quest processing apparatus according to claim 7, wherein the at least one processor is further configured to execute the set of instructions to cause the apparatus to perform:

storing a correspondence between the logical address corresponding to the logical container and domain name information corresponding to the logical container into a domain name system (DNS) service;

acquiring, by a third container, the logical address corresponding to the logical container from the DNS service based on the domain name information corresponding to the logical container; and accessing, by the third container, the container cluster corresponding to the logical container based on the logical address corresponding to the logical container.

13. A non-transitory computer readable medium that stores a set of instructions that is executable by at least one processor of a computer to cause the computer to perform a user request processing method, the method comprising:

determining a first container corresponding to a user request;

determining a logical container corresponding to the first container based on a preset relationship between the first container and the logical container;

acquiring a container cluster corresponding to the logical container based on a logical address corresponding to the logical container, wherein the container cluster includes at least two second containers, wherein acquiring the container cluster corresponding to the logical container comprises:

querying, according to the logical address corresponding to the logical container, a correspondence between logical addresses and container clusters to obtain the container cluster corresponding to the logical address; and determining the container cluster corresponding to the logical address as the container cluster corresponding to the logical container; and processing the user request by using at least one of the second containers.

14. The non-transitory computer readable medium according to claim 13, wherein determining the first container corresponding to the user request comprises:

parsing out at least one of domain name information and IP address information from the user request, and determining a first container matching the domain name information or the IP address information.

15. The non-transitory computer readable medium according to claim 13, wherein determining the logical container corresponding to the first container comprises:

configuring a link relationship between the first container and the logical container; and determining the logical container corresponding to the first container based on the link relationship.

16. The non-transitory computer readable medium according to claim 13, wherein processing the user request by using at least one of the second containers comprises:

allocating, according to a preset policy, processing tasks associated with the user request to each of the at least two second containers; and using each second container to process the allocated processing tasks, wherein the preset policy comprises a load balancing policy.

17. The non-transitory computer readable medium according to claim 13, wherein the set of instructions that is executable by the at least one processor of the computer causes the computer to further perform:

storing a correspondence between the logical address corresponding to the logical container and domain name information corresponding to the logical container into a domain name system (DNS) service;

acquiring, by a third container, the logical address corresponding to the logical container from the DNS service based on the domain name information corresponding to the logical container; and accessing, by the third container, the container cluster corresponding to the logical container based on the logical address corresponding to the logical container.

* * * * *